UNITED STATES PATENT OFFICE.

JAMES J. FRONHEISER, OF JOHNSTOWN, PENNSYLVANIA.

MANUFACTURE OF PIGMENTS.

SPECIFICATION forming part of Letters Patent No. 495,197, dated April 11, 1893.

Application filed November 27, 1891. Serial No. 413,269. (No specimens.)

*To all whom it may concern:*

Be it known that I, JAMES J. FRONHEISER, a citizen of the United States, residing at Johnstown, in the county of Cambria and State of Pennsylvania, have invented certain new and useful Improvements in the Manufacture of Pigments; and I do hereby declare the following to be a full, clear, and exact description of the invention, such as will enable others skilled in the art to which it appertains to make and use the same.

The object of my invention is to cheapen the manufacture of iron paint while improving its quality, and providing a method by which not only iron slags, and oxides now employed for the purpose may be used, but also the slags from pyrites furnaces, and the hard and dense iron ores, shales or clays, which on account of their dense crystallization or granular structure are in their natural or calcined conditions unfit for the manufacture of paint can also be used.

My invention consists in the treatment of comminuted iron slags from heating and puddling furnaces, and natural and artificial oxides of iron and other ferruginous material, with an aqueous solution containing sulphate of iron and sulphuric acid to make a product for mixing with oil or other vehicles to form paint. As these elements, viz.: sulphate of iron and sulphuric acid, are found in about the proper and effective proportions in the sludge of waste liquor from vats in which iron and steel have been pickled or cleaned with sulphuric acid, and as this waste liquor is cheaper than a solution specially prepared for this use, I prefer to employ it in my process.

At present the Venetian, &c., reds of commerce are made either by heating the oxides of iron as they are sometimes found in nature, obtained by precipitation, &c., to the different degrees of temperature necessary to produce the desired shade; or they are produced by the decomposition of copperas at the proper heat, by first driving off the sulphuric and sulphurous acids into the air, or by neutralizing the same by the addition of lime in the form of limestone, oyster-shells, &c., or in its caustic condition, after which it is mixed with gypsum, white clay, heavy spar or any other inert or neutral material. These red pigments are also sometimes obtained by treating finely ground puddle-slag which consists chiefly of oxides and silicates of iron, with sulphuric acid of commerce, allowing the mass to remain in a cold condition for some time so as to decompose, if possible, the silicates of iron, and convert them into sulphates. This mixture of sulphate of iron and silica is then heated in a suitable furnace to again drive off the sulphuric and sulphurous acids, and there remains a mass consisting of peroxide of iron of the desired shade, together with the silica in a partly combined and partly free state.

In the manufacture of all red iron pigments the peroxide of iron is the source of the color, and the more oxide of iron of the proper shade it contains, the larger will be the percentage of gypsum, white clay, heavy spar, or any other neutral or inert material that can be added. By the use of copperas alone, mixing it with lime as a hydrate, carbonate, sulphate or any of its forms of chemical combination, one will obtain only the equivalent or coloring matter furnished by the copperas. By the decomposition of puddle, heating furnace, &c., slags, as practiced by some manufacturers, with commercial sulphuric acid, only the coloring matter obtained from the iron of such slags is available or of service.

In my process, I have both sources of coloring matter, as the sulphuric acid of my solution operates upon the iron, while the sulphate of iron which it contains consists of protoxide of iron and sulphuric acid (FeO+$H_2So4$+$7H2O$), and by my operation, the protoxide (FeO), is all converted into peroxide ($Fe2O3$) which is the desired coloring matter.

The resultant pigment, by my process, contains peroxide of iron derived from the slags and ores, and also from the copperas, giving to it more coloring matter which will admit of the use of a larger percentage of inert or neutral material than the pigments made by any of the other processes employed to produce the same effect.

In my method, when I employ the spent liquors from pickling vats, I evaporate them to the proper degree of concentration, which is determined by estimating the percentage of total sulphuric acid in the solutions by chemical analysis, adding thereto enough slag, ore or other suitable ferruginous matter the composition of which is likewise first determined by chemical analyses, to have all of the iron of these materials converted into sulphate by the free sulphuric acid, and the acid subsequently eliminated from the copperas at the necessary degree of heat, the entire mass being heated first slowly, then gradually to a higher degree with the admission of air, long and intense enough to produce the desired shade, and to free the mass from sulphuric acid. The operation is performed in a suitable furnace heated from the outside in which the spent liquors are preferably first evaporated, the ores, &c., being then mixed with them; though good results will be obtained by first introducing the ores or other materials and evaporating the spent liquors in their presence.

By my process, such iron ores and slags as contain their iron in the form of oxides, but in their natural condition are too hard and granular to be economically ground fine enough for paint, may be rendered spongy or more porous. Slags are decomposed and all of their desired coloring properties, as well as coloring properties of the copperas contained in the sludge are brought into use. The proportions of slags to be added to the concentrated spent liquors will depend upon their chemical composition, and the desired shade of pigments to be made. They should be mixed in such proportions based on the percentage of free and combined sulphuric acid in the liquors and the chemicals equivalent of the acid necessary to decompose the added material so that there shall be no free acid remaining in the finished paint. The pigment after it is taken from the furnaces and allowed to cool, is ground to a fine powder and can be mixed with other pigments and oils by any of the well-known methods.

I am aware that pulverized iron slags have been employed in the manufacture of pigments by treating them with commercial sulphuric acid and applying heat to the mass, with or without the introduction of air. My process differs from this, in that by the methods heretofore employed, spent liquors could not be used owing to the small percentage of free acid which they contain; and there is the further difference that the copperas contained in the spent liquors is decomposed, furnishing sulphuric acid which attacks the slags and peroxide of iron which contributes to the coloring element of the mass.

Having thus fully described my invention, what I claim as new, and desire to protect by Letters Patent, is—

The process of making pigments which consists in taking an aqueous solution of sulphate of iron and sulphuric acid, evaporating said liquor to the proper degree of concentration and adding thereto comminuted ferruginous matter and applying heat to the mass, as described.

In testimony whereof I affix my signature in presence of two witnesses.

JAMES J. FRONHEISER.

Witnesses:
 CYRUS ELDER,
 C. P. SCOBY.